Patented Jan. 30, 1934

1,945,121

UNITED STATES PATENT OFFICE 1,945,121

PROCESS FOR REFINING PETROLEUM OIL

Walter L. Savell, Forest Hills, N. Y., assignor to The Mathieson Alkali Works, Inc., New York, N. Y., a corporation of Virginia No Drawing. Application October 5, 1932
Serial No. 636,331

5 Claims. (Cl. 196—42)

My invention relates to improvements in refining petroleum oils, particularly lower boiling petroleum oils such as gasolines, naphtha fractions and kerosenes.

It has hitherto been proposed to use aqueous solutions of hypochlorites in refining, for example, gasoline. With some gasolines, and with respect to some properties of the refined gasolines, one or more of these operations involving the use of aqueous solutions of hypochlorites has been satisfactory, but with some gasolines, and with respect to some properties of the refined gasolines, none of them has been entirely satisfactory. Cracked gasolines in particular have frequently proven refractory with respect to such operations.

I have discovered that the use of substantially dry calcium hypochlorite containing upwards of 50% available chlorine in the refining of such petroleum oils affords several important advantages.

Reduction of the sulphur content of the oil is one of the primary purposes of such refining operations. Substantially dry calcium hypochlorite appears to react upon the sulphur compounds usually present in such oils, hydrogen sulphide, ethyl mercaptan, isobutyl mercaptan, normal butyl sulphide and ethyl disulphide for example, as an oxidizing agent converting them, or part of them, to other compounds from which a refined oil can be easily separated. Aqueous solutions of hypochlorites also appear to react with respect to some of the sulphur compounds as oxidizing agents, but, in the presence of substantial amounts of water, other reactions, the formation of chlorhydrins with olefinic constituents of the oil for example, are also involved and these other reactions not only consume the hypochlorite without useful result with respect to the refining operation but also introduce complicating factors which tend to render the operation unsatisfactory with respect to one or more properties of the treated oil. Such side reactions are avoided or minimized by using calcium hypochlorite containing upwards of 50% available chlorine in the absence of any substantial amount of water. I make the foregoing observations as a possible explanation of the results secured by my invention, but I predicate the invention upon the results rather than upon this or any other hypothesis tending to explain the results.

According to my invention, the oil to be refined is subjected to the action of substantially dry calcium hypochlorite containing upwards of 50% available chlorine at a sub-cracking temperature. The temperature maintained during the refining operation may approximate, with advantage, 200°–600° F. Lower temperatures can be used, but the operation is with advantage carried out at an elevated temperature, lower however than that at which any substantial cracking begins. Such elevated temperature may be attained in a digesting operation or in a distillation operation, and this distillation operation may be combined with the refining operation for the separation of a refined fraction from the treated oil. A period of contact between the substantially dry calcium hypochlorite and the oil of 10–20 minutes for example is usually appropriate, although this period may be prolonged, as in an operation including digestion or distillation, particularly when the latter steps are carried out as continuous operations. It is advantageous to separate the product from the treated oil as a refined fraction by distillation, particularly with respect to the color of the product. Such distillation may be effected before or after separation of the sludge produced during the refining operation, by decantation following settling for example, although it is usually advantageous to subject the oil-calcium hypochlorite mixture to this distillation so that the oil is maintained in contact with the calcium hypochlorite during distillation. It will be understood that intimate and distributed contact between the substantially dry hypochlorite and the oil to be refined is effected by using the calcium hypochlorite in finely divided form and by appropriate agitation of the mixture. The invention is of special value in the treatment of cracked petroleum oils.

In referring to "substantially dry calcium hypochlorite" I refer not to an absolutely anhydrous material but to a material containing, for example, the 2%–3% of moisture commonly encountered in commercially dry calcium hypochlorite. In referring to "calcium hypochlorite containing upwards of 50% available chlorine" I intend to distinguish calcium hypochlorite products high in available chlorine from ordinary bleaching powder or chlorinated lime. These calcium hypochlorite products high in available chlorine are, however, distinguished from ordinary bleaching powder or chlorinated lime not only by their chlorine content but also by their chemical constitution. Calcium hypochlorite products such as those the production of which is described in Letters Patent Number 1,787,048, granted to The Mathieson Alkali Works, December 30, 1930, on an application of Robert B. MacMullin and Maurice C. Taylor, for example, are useful in carrying out my invention. In referring to "sub-cracking temperatures" I intend to refer to temperatures below those at which substantial cracking of the particular oils begins; my invention is a refining operation and not a cracking operation. The petroleum oils subjected to the treatment of my invention should also be substantially dry.

An advantageous proportion of the calcium hypochlorite to be used, in any particular case, can be determined as follows: A series of 10 cc. samples of the oil to be refined are agitated for 30 minutes with amounts of calcium hypochlorite solutions containing 5 grams per liter of available chlorine of 0.5 cc., 1.0 cc., 1.5 cc., etc., thereafter adding the conventional "doctor test" solution (sodium plumbite) and sulphur in the conventional manner to each 10 cc. sample and thereafter shaking each sample for 5 minutes. A brown coloration at the line between the "doctor test" solution and the supernatant sample indicates the use of too small an amount of available chlorine and a yellow coloration indicates the use of too large an amount of available chlorine. From the sample which shows no reaction with the "doctor test" solution and no excess available chlorine, the proportion of the particular calcium hypochlorite to be used is calculated from the proportion of available chlorine used in this optimum sample by the usual stoichiometric methods.

My invention enables the production of refined products which are sweet, of good odor, satisfactory with respect to the "doctor test" and the "copper strip test", of excellent color, and stable upon exposure to light.

I claim:

1. In refining petroleum oils, the improvement which comprises subjecting the oil to the action of substantially dry calcium hypochlorite containing upwards of 50% available chlorine at a sub-cracking temperature.

2. In refining petroleum oils, the improvement which comprises subjecting the oil to the action of substantially dry calcium hypochlorite containing upwards of 50% available chlorine at a temperature approximating 200–600° F.

3. In refining cracked petroleum oils, the improvement which comprises subjecting the cracked oil to the action of substantially dry calcium hypochlorite containing upwards of 50% available chlorine at a sub-cracking temperature.

4. In refining petroleum oils, the improvement which comprises subjecting the oil to the action of substantially dry calcium hypochlorite containing upwards of 50% available chlorine at a sub-cracking temperature, and thereafter separating a refined fraction from the treated oil by distillation.

5. In refining petroleum oils, the improvement which comprises subjecting the oil to the action of substantially dry calcium hypochlorite containing upwards of 50% available chlorine at a sub-cracking temperature, and thereafter separating a refined fraction from the oil-calcium hypochlorite mixture by distillation.

WALTER L. SAVELL.